| United States Patent [19] | [11] Patent Number: 4,647,604 |
| Kempter et al. | [45] Date of Patent: Mar. 3, 1987 |

[54] HEAT-CURABLE COATING AGENT AND ITS USE

[75] Inventors: Fritz E. Kempter, Mannheim; Harro Petersen, Frankenthal; Eberhard Schupp, Schwetzingen; Günther Sabelus, Lambsheim; Horst Schmidt, Mannheim, all of Fed. Rep. of Germany

[73] Assignee: BASF Aktiengesellschaft, Fed. Rep. of Germany

[21] Appl. No.: 744,205

[22] Filed: Jun. 13, 1985

[30] Foreign Application Priority Data

Jun. 16, 1984 [DE] Fed. Rep. of Germany ....... 3422473

[51] Int. Cl.$^4$ .............................................. C08L 63/00
[52] U.S. Cl. ................... 523/402; 523/414; 523/416
[58] Field of Search ................... 523/402, 414, 416

[56] References Cited

U.S. PATENT DOCUMENTS

| 3,716,402 | 2/1973 | Hicks | 524/539 |
| 4,064,090 | 12/1977 | Gibson et al. | 524/843 |
| 4,093,594 | 6/1978 | Anderson | 523/400 |
| 4,212,779 | 7/1980 | Schmolzer et al. | 524/595 |
| 4,252,703 | 2/1981 | Patzschke et al. | 523/404 |
| 4,565,838 | 1/1986 | Paar et al. | 523/414 |
| 4,568,709 | 2/1986 | Paar et al. | 523/414 |

*Primary Examiner*—Lewis T. Jacobs
*Attorney, Agent, or Firm*—Keil & Weinkauf

[57] ABSTRACT

The heat-curable coating agent according to the invention contains a combination of a binder, which possesses basic nitrogen groups and is rendered water-dilutable by protonation with an acid, and a crosslinking agent and, if required, pigments, fillers, corrosion inhibitors, surface coating assistants and catalysts, and the binder used is a reaction product of a dicarboxylic acid or of a dicarboxylate or of a (meth)acrylate oligomer or polymer with an adduct of a di- or triglycidyl ether and a polyamine, the polyamine containing 2 or more amine nitrogen atoms per molecule and one or more alkylene chains of 3 or more carbon atoms between the amino groups, and has an NH amine number of from 50 to 150 mg of KOH/g and is combined with aminoplasts and/or phenoplasts as crosslinking agents.

The novel coating agent is useful as a binder for the cathodic electrocoating of metal articles.

11 Claims, No Drawings

HEAT-CURABLE COATING AGENT AND ITS USE

The present invention relates to heat-curable aqueous coating agents which are cured with aminoplasts and phenoplasts and are particularly useful for the cathodic electrocoating of metal articles.

Although systems containing crosslinking agents of this type have been described, to date they are not used in practice to the extent which would have been expected from the large number of aminoplast and phenoplast resins available.

German Laid-Open Application DOS No. 2,737,375 describes reaction products of polyepoxy resins with polyamines, which are reacted with not less than 2 moles of a monoepoxide or $C_8$–$C_{24}$-monocarboxylic acid per mole of the adduct. Monoepoxides are preferred, and the crosslinking agents used are aminoplasts and phenoplasts. The baking conditions stated here are 30 minutes and 190° C.

German Laid-Open Application DOS No. 2,426,996 describes cathodic electrocoating baths which are prepared from reaction products of a diepoxy resin with monofunctional and polyfunctional amines, the polyfunctional amines acting as coupling agents and the monofunctional ones as terminaters. The crosslinking agents used are likewise aminoplasts and phenoplasts.

According to German Laid-Open Application DOS No. 2,936,356, precondensed heat-curable coating agents are obtained from binders which contain primary and/or secondary amino groups and may contain tertiary amino groups, using crosslinking agents which have terminal COOH groups, are partially esterified with monoalcohols (ester number>30), and are stable at neutral pH and reactive toward amino groups in a basic medium.

German Laid-Open Application DOS No. 2,936,411 describes self-crosslinking heat-curable aqueous coating agents which contain synthetic resins which possess primary and/or secondary amino groups, may furthermore possess tertiary amino groups and contain esterified terminal carboxyl groups. In some examples, commercial phenol resins are used concomitantly.

European Pat. No. 004,090 relates to aqueous cathodic electrocoating finishes which are described as amino-containing organic synthetic resin binders in combination with a crosslinking agent which possesses esterified terminal carboxyl groups.

German Laid-Open Application DOS No. 3,014,290 discloses epoxy resin/amine adducts which are copolymerized with monoacrylates, the comonomer stated being acrylic acid. The products are precondensed with aminoplasts and phenoplasts.

U.S. Pat. No. 3,716,402 relates to reaction products of polyfunctional epoxides with primary amines and polycarboxylic acids or anhydrides, in some cases in combination with an aminoplast resin.

German Laid-Open Application DOS No. 2,805,936 discloses carboxyl-containing cationic binders or binder combinations. The crosslinking agents used are aminoplasts and phenoplasts, which, where they are not water-soluble, are precondensed with the binders.

Finally, German Laid-Open Application DOS No. 3,008,810 describes self-crosslinking binders which consist of reaction products which contain primary and/or secondary amino groups and are obtained from epoxide compounds and half-blocked or partially blocked di- or polyisocyanates, with or without polyamines which possess oxazolidine groups.

It is an object of the present invention to provide a binder which, when used together with the commercial aminoplasts and phenoplasts in a system comprising two or more components, is capable of being used in the various fields of application of a cataphoretic coating system, for example for priming and in industrial surface coatings (including white and silver finishes). Furthermore, the aqueous coating agents should be satisfactorily dispersible at pH 7–8, the required curing temperature should be very low (about 160° C.) and the coating agents should possess particularly good throwing power and resilience, even in the case of underbaking of parts of the workpiece which do not reach the intended baking temperature.

We have found that this object is achieved in an advantageous manner by the heat-curable coating agents according to the invention.

The present invention relates to a heat-curable coating agent which contains a combination of a binder, which possesses basic nitrogen groups and can be rendered water-dilutable by protonation with an acid, and a crosslinking agent, and if required pigments, fillers, corrosion inhibitors, surface coating assistants, catalysts and, in an amount of not more than 40%, based on the total weight of the coating agent, organic solvents, wherein the binder containing basic nitrogen groups which is used is a reaction product of a dicarboxylic acid and/or a dicarboxylate, the dicarboxylic acid (ester) being optionally partially replaced by a monocarboxylic acid and/or a monocarboxylate, or of a (meth)acrylate oligomer or polymer with an adduct obtained from a di- or triglycidyl ether and a polyamine, the latter containing 2 or more amine nitrogen atoms per molecule and one or more alkylene chains of not less than 3 carbon atoms between the amino groups, with the proviso that from 2 to 10 NH equivalents of the polyamine are employed per epoxide equivalent of the di- or triglycidyl ether for the preparation of the di- or triglycidyl ether/polyamine adduct, and the binder possessing basic nitrogen groups has an NH amine number of from 50 to 150 mg of KOH/g and a viscosity of from 1 to 6,000 mPa.s, measured at 150° C. on an isodecanol so tion having a solids content of 88±1%, and is combined luwith aminoplasts and/or phenoplasts as crosslinking agents.

Preferred polyamines for the preparation of the di- or triglycidyl ether/polyamine adduct are n-hexane-1,6-diamine, 4,7-dioxadecane-1,10-diamine and 4,9-dioxadodecane-1,12-diamine.

The present invention furthermore relates to a process for the cathodic electrocoating of metal articles, therein the novel coating agents, after protonation with an acid, are used as binders.

The aminoplasts and/or phenoplasts used as crosslinking agents are combined with the binder possessing basic nitrogen groups in general in amounts of from 20 to 45% by weight.

The epoxide/amine adducts described in German Laid-Open Application DOS Nos. 2,737,375, 2,936,356 and 3,080,810 and European Pat. No. 004,090 mentioned above, and obtained from, for example, the glycidyl ether of bisphenol A and primary diamines, are compounds which have long been known and are used as, for example, curing agents for epoxides. Products which are reacted with monocarboxylic acids having chains of 8 or more carbon atoms are described in German Laid-Open Application DOS No. 2,737,375. In connection with the process described in German Laid-Open Application DOS No. 3,080,810 for the preparation of self-crosslinking binders possessing urethane groups, reaction products with dicarboxylic acids are also mentioned. However, the special combination of features which the coating agents claimed in the present invention have to possess, and the advantages thus obtained, are not suggested by any of these publications.

The present invention expressly avoids the use of di- and polyamines having a $C_2$-alkylene chain between the amino groups, e.g. ethylenediamine or diethylenetriamine. Products of this type give aqueous formulations whose dispersion stability, in combination with phenoplasts, gives unsatisfactory results. This is more pronounced in connection with the bath stability in combination with special melamine resins, where completely unacceptable drops in pH occur during ageing of the baths. Moreover, we have found that, compared with the novel coating agents, products of this type have a substantially lower bath pH and for this reason alone are unsuitable for the desired use at the required pH of 7–8.

Regarding the components of the novel coating agents, the following may be stated specifically.

The novel aqueous coating agent is prepared from a reaction product of an adduct of a polyepoxy resin and a di- or polyamine, containing one or more $C_3$-alkylene chains between the amino groups, with a dicarboxylic acid or an ester thereof, if desired as a mixture with minor amounts of a monocarboxylic acid or an ester thereof and/or an oligomeric or polymeric acrylate or methacrylate, and is combined with aminoplasts and/or phenoplasts as crosslinking agents.

The polyamine contains, per molecule, two or more amine nitrogen atoms and three or more carbon atoms between the amino groups, and preferably two primary amino groups or four or more amine hydrogen atoms. In general, not more than one mole of the amine is reacted with each epoxide group of the polyepoxy resin. The reaction with dicarboxylic acid or the ester thereof, if desired as a mixture with a monocarboxylic acid or an ester thereof and/or an oligomeric or polymeric acrylate or methacrylate, is carried out so that the reaction product has an NH amine number of from 50 to 150, preferably from 100 to 130, mg of KOH/g, based on the binder possessing basic nitrogen groups (solid, without crosslinking agent).

The amount of tertiary nitrogen should be kept very small. In the novel binders, the content of this nitrogen is essentially determined by the amount of excess amine reacted with the epoxy resin, from 2.0 to 10.0, preferably from 2.5 to 8, NH equivalents of the polyamine being employed per epoxide equivalent of the di- or triglycidyl ether. In general, the total nitrogen content is about 5%, based on the epoxide/amine adducts, and the content of tertiary amine is <0.5%.

The composition of the epoxide/amine adduct (EA) can be represented by the following formulae:

B—A—B

B—A—B—A—B

The binder composition is essentially described by the formulae given below:

EA—C—EA

EA—C—EA—C—EA

EA—C—EA—C—EA—D where A is a radical of an epoxy resin, B is a radical of a polyamine or diamine, EA is a radical of an epoxide/amine adduct, C is a radical of a dicarboxylic acid or of an oligomeric or polymeric acrylate, and D may furthermore be a radical of a monocarboxylic acid, and branching can be introduced into, for example, dimeric fatty acids and oligomers or polyacrylates by means of tertiary nitrogen atoms and tricarboxylic acids present in proportionate amounts.

The monocarboxylic acids which may be present serve as chain terminaters, for example for maintaining the desired viscosity range of the binder of from 1 to 6,000, preferably from 500 to 5,000, mPa.s, measured at 150° C. on an isodecanol solution having a solids content (according to DIN No. 53,216) of 88±1%, using an ICI plate-and-cone viscometer.

Suitable di- or triglycidyl ethers for the preparation of the di- or triglycidyl ether/polyamine adduct are the conventional glycidyl polyethers of polyhydric phenols which possess two or three, preferably two, 1,2-epoxide groups per molecule. Polyepoxy resins of this type are derived from an epihalohydrin and a dihydric or polyhydric phenol and have an epoxide equivalent weight of from about 190 to about 4,000, preferably not more than 2,500. Specific examples of suitable epihalohydrins are epichlorohydrin, epibromohydrin and epiiodohydrin, epichlorohydrin being preferred. Specific examples of dihydric phenols (diphenols) are resorcinol, hydroquinone, p,p'-dihydroxyphenylpropane (bisphenol A), p,p'-dihydroxybenzophenone, p,p'-dihydroxydiphenyl, p,p'-dihydroxydiphenylethane, bis-(2-hydroxynaphthyl)-methane, 1,5-dihydroxynaphthylene and novolaks; bisphenol A is preferred. These polyepoxy resins are known and are generally prepared with the desired molecular weights by reacting the epihalohydrin with the dihydric phenol in various weight ratios, or by reacting a dihydric phenol with a polyepoxy resin having a lower molecular weight. Particularly preferred polyepoxy resins are glycidyl polyethers of bisphenol A having epoxide equivalent weights of from about 190 to about 2,500.

The polyamines reacted according to the invention with the polyepoxy resins are preferably diamines, in particular amines possessing two primary amino groups per molecule and one or more $C_3$-alkylene chains. The diamines may be aliphatic or cycloaliphatic, examples being 1,3-propylenediamine, 1,4-butylenediamine, 1,5-pentamethylenediamine and, particularly preferably, hexamethylenediamine, as well as 4,7,10-trioxatridecane-1,13-diamine, 4,5-dioxadecane-1,10-diamine, 4,9-dioxadodecane-1,12-diamine, 4,4'-methylenebiscyclohexylamine, 1,4-cyclohexanediamine and isophoronediamine. An example of a compound from the series consisting of the polyamines is dipropylenetriamine.

To prepare the di- or triglycidyl ether/polyamine adducts, the reaction of the epoxy resins with the amine is carried out using from 2 to 10, preferably from 2.5 to 8.0, NH equivalents per epoxide equivalent, in general the amine being initially taken and the epoxy resin, in the the form of a melt or solution, being added at from 40° to 150° C. The excess amine is then removed, this advantageously being effected using the conventional industrial falling film and thin film evaporators, which ensure substantial or complete removal of even relatively high boiling diamines.

The dicarboxylic acids, or esters thereof, which can be used according to the invention possess 3 to 38 carbon atoms in the acid moiety. Examples of suitable compounds are adipic acid, sebacic acid, nonanedicarboxylic acid, decanedicarboxylic acid, dodecanedicarboxylic acid, dimeric fatty acids, e.g. ®Pripol 1014 from Unilever, etc., and phthalic acid and terephthalic acid, or mixtures of these dicarboxylic acids.

The use of the corresponding esters is envisaged only if they are sufficiently compatible or become so as the reaction progresses.

Monocarboxylic acids or esters thereof may be present as a mixture with these dicarboxylic acids or esters thereof, but their amount, expressed in terms of the number of equivalents of carboxyl groups, should not in general exceed the amount of dicarboxylic acid. They contain 2 to 24 carbon atoms in the acid moiety of the compound, suitable examples being α-ethylhexanoic acid, isononanoic acid, caprylic acid, caproic acid, stearic acid, linoleic acid, linolenic acid and benzoic acid.

Suitable (meth)acrylate oligomers or polymers have molecular weights of from 300 to 2,500, preferably from 500 to 1,500 and are prepared by the conventional polymerization methods, as homopolymers or copolymers, from (meth)acrylates, (meth)acrylic acid, aromatic vinyl monomers and copolymerizable unsaturated compounds whose ability to undergo copolymerization is predetermined by the copolymerization parameters (copolymerization parameters: J. Polym. Sci. 54 (1961), 411–455).

The reaction temperatures at which amide groups are formed vary from 120° to 200° C., depending on the carbonyl activity. The mode of action of these monocarboxylic acids present has been discussed above. Fairly long-chain molecules, e.g. stearic acid, furthermore have an advantageous effect on the wettability of the pigment by the binders.

For the dimeric fatty acid/mono-fatty acid system (equivalence of carboxyl groups), it is found that the incorporation of a dicarboxylic acid into the binder molecule results in more resilient films than those obtained when monocarboxylic acids are incorporated.

The reaction of the di- or triglycidyl ether/polyamine adduct with the dicarboxylic acid or an ester thereof is generally carried out at from 100° to 200° C., the lower temperature range being the preferred one for the ester aminolysis.

It is to be assumed that virtually exclusively the primary amino groups of the epoxide/amine adduct participate in this reaction. In the reaction with dicarboxylic acids, the desired acid number for the reaction product is from less than 5 to 10, while the desired ester number in the corresponding esters is within a similar range; for the reaction with oligomeric and polymeric acrylates, an ester number <20 is desirable.

The binder possessing basic nitrogen groups has an NH amine number of from 50 to 150, preferably from 80 to 130, mg of KOH/g and a melt viscosity of from 1 to 6,000 mPa.s, measured at 150° C. on an 88% strength (±1%) solution in isodecanol, and is rendered water-dilutable by protonation with acids, in particular organic acids, preferably carboxylic acids, e.g. acetic acid, lactic acid or formic acid.

According to the invention, the said binder is combined with aminoplasts and/or phenoplasts and preferably used for the cathodic electrocoating of electrically conductive surfaces, in particular of metal articles which may also be chemically pretreated, for example components of iron, steel, copper or aluminum.

The cathodic electrocoating bath therefore contains not only the aqueous dispersion or solution of a salt of the said binder but also contains an aminoplast or phenoplast resin. Suitable aminoplast resins are the reaction products of ureas and melamines with aldehydes, which may be further etherified with an alcohol. Examples of suitable aminoplast resin components are urea, ethyleneurea, 2-oxo-4-hydroxyhexahydropyrimidine, thiourea, melamine, benzoguanamine and acetoguanamine, while examples of useful aldehydes are formaldehyde, acetaldehyde, isobutyraldehyde and propionaldehyde, preferably formaldehyde and isobutyraldehyde. The aminoplast resins can be employed in the alkylene form, but are preferably used in the ether form, the etherification agent being a monohydric alcohol of 1 to about 8 carbon atoms. Examples of suitable aminoplast resins are methylolurea, dimethoxymethylolurea, butylated polymeric urea/formaldehyde resins, hexamethoxymethylmelamine, methylated polymeric melamine/formaldehyde resins and butylated polymeric melamine/formaldehyde resins. For example, highly etherified products having a low methylol content are very useful. Aminoplast resins and methods for their preparation are described in Encyclopedia of Polymer Science and Technology, volume 2 (1965), pages 1–91, Interscience Publishers.

Examples of phenoplast resins are the conventional reaction products of phenols with aldehydes, these products possessing reactive methylol groups, and their aza analogs obtained from aldehydes and amines, for example secondary amines (cf. for example German Laid-Open Application DOS No. 2,320,536 and German Pat. Nos. 2,320,301, 2,357,075 and 2,554,080). Depending on the phenol/aldehyde molar ratio employed in the first condensation stage, these resins can be monomeric or polymeric. Specific examples of phenols used for the preparation of phenoplast resins are phenol, o-, m- and p-cresol, 2,4-xylenol, 3,4-xylenol, 2,5-xylenol, Cardanol and p-tert.-butylphenol. Aldehydes which can be used for this reaction are formaldehyde, acetaldehyde, propionaldehyde and isobutyraldehyde, preferably formaldehyde and isobutyraldehyde. Particularly useful phenoplast resins are polymethylolphenols in which the phenol group has been etherified with an alkyl radical, (e.g. methyl or ethyl). Preferably used products are those which possess allyl ether groups. Phenoplast resins and their methods of preparation are described in Encyclopedia of Polymer Science and Technology, volume 10 (1969), pages 1–68, Interscience Publishers. Bisphenols, such as bisphenol A, and novolaks or those products in which some or all of the methylol groups have been etherified with alcohols are preferred.

The amount of aminoplast or phenoplast resin used according to the invention is about 20–50, preferably from about 25 to about 40, % by weight, based on the total weight of solids in the organic coating agent (=binder possessing basic nitrogen groups + aminoplast and/or phenoplast resin).

An advantage of the binder is that it can also be combined with fairly large amounts of the cross-linking agents used according to the invention. To do this, the binder possessing basic nitrogen groups is mixed with the aminoplast or phenoplast resins at room temperature or slightly elevated temperatures. If, however, it is necessary, for reasons relating to manufacture or performance characteristics, for example in order to remove methylol groups of the aminoplast or phenoplast resins, it is necessary to keep the resin combination at a higher temperature (about 70°-120° C.), the onset of condensation must be expected. This entails a loss of $NH_2$ functions, i.e. a corresponding decrease in the pH of the surface coating baths. Hence, the content of NH groups should not fall below the specified lower limit (80 mg of KOH/g, based on the reaction product obtained from the epoxide/polyamine adduct and the dicarboxylic acid). This partial condensation reaction is particularly preferable when binders possessing basic nitrogen groups and having a viscosity in the lower part of the range (<about 2,000 mPa.s, measured at 150° C. on an 88% strength iso-decanol solution) are used.

The aqueous coating agents may furthermore contain pigments, fillers, coupling agents, solvents, corrosion inhibitors, catalysts and surface coating assistants, such as antioxidants and surfactants. Suitable pigments are the conventional ones, one or more pigments, such as iron oxide, lead oxides, strontium sulfate, carbon black, titanium dioxide, talc, barium sulfate, barium yellow ($BaCrO_4$), cadmium red (CdS or CdSe), chrome green or lead silicate being useful. The pigment can be used in an amount such that the pigment/binder weight ratio is not more than 2:2, preferably about 1:6. The baths may furthermore contain heavy metal ions, such as $Pb^{++}$, $Cu^{++}$, $Sn^{++}$, $Zn^{++}$, $Co^{++}$, or $Zr^{++}$, for example in the form of their acetates, naphthenates or oleates.

The coupling solvents are water-soluble or partially water-soluble organic solvents for the resin components used according to the invention. Specific examples of such solvents are ethylene glycol monomethyl ether, ethylene glycol monoethyl ether, ethylene glycol monobutyl ether, ethylene glycol monohexyl ether, diethylene glycol monobutyl ether, phenylglycol, benzyl alcohol, ethanol, isopropanol and isobutanol. The coupling solvents are used in amounts of from 0 to 8% by weight, based on the total weight of the coating bath. The total solids content of the electrocoating bath is kept at from about 5 to about 25, preferably from about 10 to about 20, % by weight, based on the total weight of the bath.

If it is intended to accelerate the curing of the novel coating agents, this can be achieved in a simple manner by incorporating sulfonate groups into the epoxide/amine adduct in an amount of from 0.01 to 1.5%, preferably from 0.1 to 1.3%, in particular from 0.2 to 1.0%.

To do this, the epoxide/amine adduct is reacted with amidosulfonic acid, this reaction being carried out at from 140° to 180° C., and ammonia being eliminated.

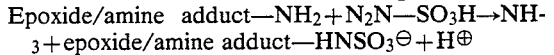
Epoxide/amine adduct—$NH_2$+$N_2N$—$SO_3H$→$NH_3$+epoxide/amine adduct—$HNSO_3^{\ominus}$+$H^{\oplus}$ To ensure that the intended amounts of the catalytic sulfonate groups are incorporated into the binder, care should be taken to effect complete conversion, i.e. complete elimination of $NH_3$.

The cathodic electrocoating finishes obtained from the protonated coating agents according to the invention can also be processed by a conventional method, by spraying, immersion, flooding, etc., and have a pH of from 6.5 to 8.7, preferably from 6.8 to 8.5, in particular from 7.0 to 8.2 (in this context, cf. German Laid-Open Application DOS No. 2,737,375, page 12, 1st paragraph, lines 7 to 9) and a conductivity of from 700 to 2,500, preferably from 1,000 to 2,000, μS.

To deposit the coating agent onto the electrically conductive article connected as the cathode, a d.c. voltage of from 200 to 500 V is applied for about 1-3 minutes. Bath materials which remain adhering are washed off, after which the film deposited cathodically on the electrically conductive article is cured, for example at from 140° to 190° C., preferably from 150° to 175° C., for from 10 to 30 minutes.

When used for cathodic deposition, the novel coating agents give colorless or slightly colored coatings, depending on the crosslinking agent used, and are suitable, for example in combination with melamine resins, for the preparation of white or silver finishes. They possess the good throwing power necessary for use as a primer; where hexamethylenediamine is used for the preparation of the epoxide/amine adduct, the throwing power of the said finishes is very good. Moreover, they have excellent mechanical properties, in particular resilience, and very good corrosion resistance, even in combination with melamine resins, for example in the salt spray test.

In the Examples, parts and percentages are by weight, unless stated otherwise.

Preparation of the diglycidyl ether/polyamine adducts (A) 1,153 parts of a diglycidyl ether obtained from epichlorohydrin and bisphenol A and having an epoxide value of 0.5 and 288.0 parts of a resin of this type having an epoxide value of 0.2 are dissolved in 617.5 parts of toluene at 70° C.

1,912.0 parts of this solution are metered into 462.0 parts of 1,3-diaminopropane at 70° C. in the course of 2.5 hours, and the excess amine and the solvent are substantially removed under reduced pressure, at from 200° to 210° C. in the final stage.

The adduct has an amine number of 235 mg of KOH/g, 9.0 mg of KOH/g being attributable to tertiary amino groups. It has a total nitrogen content of 5.3%, 2.3% being attributable to primary amino groups, 2.8% to secondary amino groups and 0.2% to tertiary amino groups.

(B) 1,614.6 parts of a diglycidyl ether obtained from epichlorohydrin and bisphenol A and having an epoxide value of 0.5 and 403.0 parts of a resin of this type having an epoxide value of 0.2 are dissolved in 864.5 parts of toluene at 70° C.

2,678.0 parts of this solution are metered into 869.2 parts of hexamethylenediamine at 70° C. in the course of 2.5 hours, some of the excess amine is removed under reduced pressure at 150° C., and the concentrate is freed from excess amine in a thin film evaporator at 190° C. and under 0.3 mm Hg.

The product has a softening point of 70° C. and a total nitrogen content of 4.7%, 1.9% being attributable to primary amino groups, 2.6% to secondary amino groups and 0.2% to tertiary amino groups.

(C) 807.3 parts of a diglycidyl ether obtained from epichlorohydrin and bisphenol A and having an epoxide value of 0.5 and 201.6 parts of a resin of this type having an epoxide value of 0.2 are dissolved in 150.0 parts of ethylglycol at 80° C.

1,076.0 parts of this solution are metered into 764.0 parts of 4,9-dioxadodecane-1,2-diamine at 70° C. in the course of 2 hours. The product is concentrated slightly and then freed from excess amine in a thin film evaporator at 210° C. and under 0.3 mm Hg.

The resulting product has a softening point of <35° C., an amine number of 165 mg of KOH/g and a content of tertiary amino groups of 8.8 mg of KOH/g.

(D) 1920.0 parts of a diglycidyl ether of epichlorohydrin and bisphenol A, having an epoxide value of 0.5, are dissolved in 480.0 parts of toluene.

2,000.0 parts of this solution are metered in the course of 2 hours into 1,485 parts of hexamethylenediamine at 70° C., and the product is treated further as described under B.

The adduct obtained has a softening point of 69° C. and a total nitrogen content of 4.2%, 2.0% being attributable to primary amino groups, 2.1% to secondary amino groups and 0.1% to tertiary amino groups.

(E) 2,099.0 parts of a diglycidyl ether of epichlorohydrin and bisphenol A, having an epoxide value of 0.5, and 524.2 parts of a resin of this type having an epoxide value of 0.2 are dissolved in 1,124.0 parts of toluene at 70° C.

3,481 parts of this solution are metered in the course of 2.5 hours into 682 parts of ethylenediamine at 70° C.

When the addition is complete, the excess amine is substantially removed by distillation under reduced pressure, in the final stage at 190° C. The product has an amine number of 210 mg of KOH/g.

Preparation of a polyacrylate 800 parts of isopropanol are heated at 185° C. under $N_2$ in a pressure kettle. A monomer mixture consisting of 1,404 parts of butyl acrylate, 1,152 parts of ethylhexyl acrylate, 792 parts of methyl acrylate and 252 parts of acrylic acid are metered in via a pump, in the course of 2 hours, at 185° C. Thereafter, 144 parts of di-tert.-butyl peroxide, dissolved in 100 parts of isopropanol, are added, and polymerization is continued for 1 hour. A further 18.0 parts of di-tert.-butyl peroxide in 12.5 parts of isopropanol are then metered in twice more, and polymerization is continued for a further hour in each case, after which the solvent is distilled off as far as possible. The solids content of the resin is 97.9% and the molecular weight is 810. Preparation of the binders possessing basic nitrogen groups, and electrocoating:

EXAMPLE A1

4.5 parts of amidosulfonic acid, dissolved in water, are added to 234.0 parts of the diglycidyl ether polyamine adduct described under (A), under $N_2$ and at 100° C. The mixture is freed from $H_2O$ up to 140° C., after which it is heated to 160° C. until virtually no more ammonia escapes. Thereafter, 66 parts of a dimeric fatty acid (e.g. Pripol 1014) are added, and heating is continued at 170° C. with removal of water until the acid number reaches 10.5 and the viscosity 2,300 mPa.s at 150° C., measured using an ICI. plate-and-cone viscometer. The reaction product is diluted with 40.0 parts of butylglycol, 80.0 parts of ethylglycol and 40.0 parts of ethanol, after which it has a solids content of 66% and an amine number of 62.4 mg of KOH/g. The tertiary amine number is 6.0.

To carry out electrocoating, 288.0 parts of this resin are mixed with 54.0 parts of a trimethylolphenol allyl ether, e.g. Methylon resin GE 75 108 from General Electric, 15.0 parts of ethanol and 6.3 parts of acetic acid, and the mixture is diluted slowly to 2,000 parts with fully demineralized water and stirred for 24 hours at 25° C. The bath has a pH of 7.3, and the conductivity is 1,400 μS. After deposition at 250 V for 2 minutes on zinc phosphate-coated steel sheets connected as the cathode, and baking for 20 minutes at 160° C., coatings about 17 μm thick and having excellent resilience are obtained. The corrosion test (according to DIN No. 50,021) gives a value of from 3 to 5 mm after 20 days.

EXAMPLE B1

55.0 parts of a dimeric fatty acid (e.g. Pripol 1015), 20 parts of stearic acid, 7 parts of triphenylphosphine, 80.0 parts of isodecanol and 25 parts of toluene are added to 400.0 parts of the diglycidyl ether/polyamine adduct described under B., and the mixture is heated to 100° C. Thereafter, 2.15 parts of amidosulfonic acid, dissolved in 5 parts of warm $H_2O$, are added, and the mixture is heated to 160° C. in the course of 1.5 hours, toluene, the water added, some of the water of reaction and, above 140° C., ammonia being removed. The mixture is kept at 170° C. until the viscosity reaches 1,650 mPa.s, measured at 150° C. using an Epprecht viscometer. The acid number is 6.3. The mixture is diluted with a mixture of 66.5 parts of butylglycol, 66.5 parts of ethylglycol, 66.5 parts of toluene and 41.5 parts of ethanol.

The solids content is 60.5%, the amine number is 73 mg of KOH/g, and the tertiary amine number is 4.5 mg of KOH/g.

To carry out electrocoating, 466 parts of the binder are mixed with 128.0 parts of melamine/formaldehyde resin I (melamine:formaldehyde:methoxy=about 1:4:3, solids content: about 70%, e.g. ®Cymel 325 from Cyanamid) and 46.0 parts of melamine/formaldehyde resin II (hexamethylolmelamine completely etherified with methanol/ethanol, solids content about 95%, e.g. Cymel 1116), 20 parts of isodecanol and 8.4 parts of acetic acid, and the mixture is diluted with fully demineralized water to a bath volume of 4,000 parts having a olids content of 10%, and is stirred for 24 hours at 3° C. The bath has a pH of 7.8 and the conductivity s 1,200 μS. After deposition at 300 V for 2 minutes on zinc phosphate-coated steel sheet connected as the cathode, and baking for 30 minutes at 160° C., virtually colorless coatings about 18 μm thick and having excellent resilience properties are obtained.

The throwing power (Ford method) is 18 cm, and the corrosion test (according to DIN No. 50,021) gives a value of 3 mm after 20 days.

EXAMPLE B2

61.0 parts of a dimeric fatty acid (e.g. Pripol 1014) and 19 parts of stearic acid are added to 400.0 parts of the diglycidyl ether/polyamine adduct described under (B), and the mixture is heated to about 130° C.

A solution of 48 parts of titanium tetrabutylate in 71.0 parts of isodecanol and 25.0 parts of toluene is added dropwise to the melt in the course of 5 minutes, after which the mixture is stirred at 170° C. until the acid number reaches about 3.0 mg of KOH/g. The binder then has a viscosity of 1,600 mPa.s at 150° C. To prepare a solution of about 60% strength, 65 parts of butylglycol, 65 parts of ethylglycol, 65 parts of toluene and 41.0 parts of ethanol are added. The amine number of the product is 74.3 mg of KOH/g.

To carry out electrocoating, 480.0 parts of the binder are mixed with 128.0 parts of the Methylon resin GE 75108 stated in Example A1 and 10.0 parts of acetic acid, and the mixture is diluted with fully demineralized water to a bath volume of 4,000 parts having a solids content of 10% and is stirred for 48 hours at 25° C. to remove the volatile solvents. The bath has a pH of 7.8 and a conductivity of 1,800 μS. After cathodic deposition at 300 V for 2 minutes on zinc phosphate-coated steel sheets, and baking for 20 minutes at 160° C., coatings about 17 μm thick and having excellent impact resistance are obtained. The throwing power is 20.5 cm, and the corrosion test gives a value of from 1 to 2 mm after 20 days.

EXAMPLE B3

250.0 parts of the diglycidyl ether/polyamine adduct described under (B), 25.0 parts of the polyacrylate described above, in 41.5 parts of isodecanol, and 41.7 parts of triphenylphosphine are heated to 100°-110° C., 2.00 parts of amidosulfonic acid (dissolved in water) are added, and the mixture is then heated to 140° C. During this procedure, the predominant part of the water is removed. Thereafter, the mixture is heated to 160° C., vigorous evolution of ammonia beginning. The mixture is kept at 150° C. until the viscosity reaches 3,000 mPa.s at this temperature. It is diluted with 36.0 parts of butylglycol, 36.0 parts of ethylglycol, 36.0 parts of toluene, 18.0 parts of hexylglycol and 18.0 parts of ethanol. The binder has a solids content of 60.3%, an amine number of 88.6 mg of KOH/g, an ester number of 12 mg of KOH/g and an acid number of 91 mg of KOH/g.

125.0 parts of the binder, 32.0 parts of a commercial etherified bisphenol A/formaldehyde resin (based on a butyl ether of trimethylolated bisphenol A and having a solids content of 78.5%) in isopropanol and 2.8 parts of acetic acid are mixed, after which the mixture is slowly diluted to about 1,000 parts with fully demineralized water and stirred overnight at 23° C. The pH is 7.9 and the conductivity 1,520 S. After cathodic deposition at 280 V for 2 minutes on zinc phosphate-coated steel sheets, and baking for 30 minutes at 160° C., coatings about 18 m thick are obtained. The corrosion test gives a value of from 2 to 3 mm after 20 days.

EXAMPLE C1

248.0 parts of the diglycidyl ether/polyamine adduct described under (C) and 28.0 parts of dimethyl terephthalate in 42.0 parts of isodecanol are heated to 100° C., 1.24 parts of amidosulfonic acid, dissolved in water, are added at this temperature, and the mixture is heated slowly to 150° C., first the water and subsequently ammonia being removed. Thereafter, 28.0 parts of dimethyl terephthalate in 42.0 parts of isodecanol are added, and heating is continued at 150° C. When the viscosity has reached 5,000 mPa.s at 150° C., the mixture is diluted with a mixture of 37.6 g of butylglycol, 37.6 g of ethylglycol and 33.5 of toluene.

The binder has an amine number of 72 mg of KOH/g, and ester number of 10 g of KOH/g and a solids content of 62%.

For use as an electrocoating binder, 120.0 parts of the Methylon resin GE 75108 stated in Example A1 are added and the mixture is kept at 100° C. until the viscosity reaches 3,600 mPa.s, measured at 75° C., and the amine number reaches 50.7. The mixture is then protonated with 5.4 parts of acetic acid, and brought to a solids content of 61% with 8.0 parts of isodecanol and a little water.

100.0 parts of the solid resin are slowly diluted to a volume of 1,000 parts with fully demineralized water and stirred overnight at 23° C. The pH is 7.0 and the conductivity is 1,700 μS.

After cathodic deposition at 200 V for 2 minutes on zinc phosphate-coated steel sheets, and baking for 20 minutes at 160° C., coatings about 15 μm thick are obtained. The corrosion test gives a value of about 2 mm after 20 days.

EXAMPLE C2

265.0 parts of the diglycidyl ether/polyamine adduct described under (C) and 20.5 parts of the polyacrylate described above, in 44 parts of isodecanol, and 4.4 parts of triphenylphosphine are heated to 160° C., an aqueous solution of 2.2 parts of amidosulfonic acid is added, and the mixture is heated slowly to 140° C. until the water has been completely removed and is then brought to reaction at 160° C. until the viscosity reaches 3,200 mPa.s, measured at 150° C. The mixture is diluted with 38.2 parts of butylglycol, 38.2 parts of ethylglycol, 38.2 parts of toluene, 19.0 parts of hexylglycol and 19.0 parts of ethanol.

The binder has a solids content of 60.4%, an amine number of 80 mg of KOH/g, an ester number of 11 mg of KOH/g and an acid number of 8 mg of KOH/g.

130 parts of the binder, 32.0 parts of the melamine/formaldehyde resin Cymel 325 stated in Example B1, 20.0 parts of the melamine/formaldehyde resin Cymel 1116 stated in Example B1 and 2.6 parts of acetic acid are mixed, and the mixture is diluted to 1,000 parts with fully demineralized water and stirred overnight at 23° C. The pH is 8.1 and the conductivity is 1,300 μS. After cathodic deposition at 150 V for 2 minutes on zinc phosphate-coated steel sheets, and baking for 30 minutes at 160° C., coatings about 18 μm thick are obtained. The corrsion test gives a value of from 4 to 5 mm after 20 days.

EXAMPLE D1

160.0 parts of the diglycidyl ether/polyamine adduct described under (D), 28.0 parts of a dimeric fatty acid, 9.0 parts of benzoic acid, 24.0 parts of isodecanol, 12.0 parts of hexylglycol and 3 parts of triphenylphosphine are heated to 100° C., an aqueous solution of 1.0 part of amidosulfonic acid is added, and the mixture is slowly heated to 140° C. in order to remove the water. Amidation is carried out at 170° C. until the acid number reaches 11.5. The mixture is diluted with 27.0 parts of butylglycol, 27.0 parts of ethylglycol, 27.0 parts of toluene and 12 parts of ethanol, after which it has a solids content of 60.5%, an amine number of 63.5 and a tertiary amine number of 1.4.

To carry out electrocoating, 115.0 parts of the binder are mixed with 40.0 parts of the commercial etherified bisphenol A/formaldehyde resin stated in Example B3, in isopropanol, and the mixture is protonated with 2.0 parts of acetic acid and diluted to a bath volume of 1,000 parts. After thorough stirring, the bath has a pH of 7.65 and a conductivity of 1,300 μS. After cathodic deposition at 280 V for 2 minutes on zinc phosphate-coated steel sheets and baking for 20 minutes at 170° C., coatings about 18 μm thick are obtained. The corrosion test gives a value of from 2 to 3 mm after 10 days.

Comparative Examples: Preparation of the binders, and electrocoating

COMPARATIVE EXAMPLE E1

80.0 parts of a dimeric fatty acid, 25.0 parts of stearic acid, 7.0 parts of triphenylphosphine and 72.0 parts of isodecanol are added, under N₂, to 380.0 parts of the diglycidyl ether/ethylenediamine adduct described under (E), and the mixture is melted at 100° C. Thereafter, 0.9 part of amidosulfonic acid, dissolved in 9.0 parts of water, is added, and the mixture is slowly heated to 140° C., water being removed. The reaction is then continued at 170° C., with removal of water, toluene and ammonia, until the viscosity reaches 2,900 mPa.s, measured at 150° C., and the acid number reaches 6.5 mg of KOH/g.

The mixture is then diluted with 61.0 parts of butylglycol, 61.0 parts of ethylglycol, 61.0 parts of toluene and 35.0 parts of ethanol.

The binder E1 thus obtained has a solids content of 61%, an amine number of 80 mg of KOH/g and a tertiary amine number of 5.5 mg of KOH/g.

(a) 115.0 parts of the binder E1 are mixed with 34.0 parts (~20%, based on solid resin) of the Methylon resin GE 75108 stated in Example A1, and the mixture is protonated with 2.0 parts of acetic acid and slowly diluted with fully demineralized water to a bath volume of 1,000 parts, while stirring. The dispersion has a pH of 6.5 and is unstable.

(b) 130.0 parts of the binder E1 are mixed with 23.5 parts (30%, based on solid resin) of Methylon resin GE 75108, and the mixture is protonated with 2.5 parts of acetic acid and diluted with fully demineralized water to a bath volume of 1,000 parts. The dispersion has a pH of 6.5 and is unstable.

(c) 110.0 parts of the binder E1 ere mixed with 11.0 parts of melamine/formaldehyde resin Cymel 1116 (from Cyanamid) and 30.0 parts of the melamine/formaldehyde resin Cymel 325, and the mixture is protonated with 2.0 parts of acetic acid and diluted with fully demineralized water to a bath volume of 1,000 parts. The pH of the aqueous bath is 7.0 and decreases to 5.3 after the bath has aged for 5 days at 23° C.; after 14 days, the pH of the bath has reached 4.8.

(d) In comparison, the pH of the bath described under B1 remains unchanged at 7.8 after ageing for 5 days. After ageing for 14 days, the pH is found to be 7.6.

We claim:

1. A heat-curable coating agent which comprises in combination: a binder, which possesses basic nitrogen groups and can be rendered water-dilutable by protonation with an acid, and a crosslinking agent, and optionally pigments, fillers, corrosion inhibitors, catalysts, antioxidants and surfactants and organic solvents in an amount of not more than 40%, based on the total weight of the coating agent, wherein the binder containing basic nitrogen groups is a reaction product of a dicarboxylic acid and/or a dicarboxylate, the dicarboxylic acid or dicarboxylic acid ester being optionally partially replaced by a monocarboxylic acid and/or a moncarboxylate, or of a (meth) acrylate oligomer or polymer with an adduct which is the reaction product of a di- or triglycidyl ether and a polyamine, the latter containing 2 or more amine nitrogen atoms per molecule and one or more alkylene chains of not less than 3 carbon atoms between the amino groups, with the proviso that from 2 to 10 NH equivalents of the polyamine are employed per epoxide equivalent of the di- or triglycidyl ether for the preparation of the di- or triglycidyl ether/polyamine adduct, and the binder possessing basic nitrogen groups has an NH amine number of from 50 to 150 mg of KOH/g and a viscosity of from 1 to 6, mPa.s, measured at 150° C. on an isodencanol solution having a solids content of 88±1%, and is combined with aminoplasts and/or phenoplasts as crosslinking agents.

2. A coating agent as set forth in claim 1, wherein the polyamine used for the preparation of the di- or triglycidyl ether/polyamine adduct is n-hexane-1,6-diamine, 4,7-dioxadecane-1,10-diamine or 4,9-dioxadodecane-1,12-diamine.

3. A coating agent as set forth in claim 1, wherein a dimerized fatty acid is used as the dicarboxylic acid and/or dicarboxylate for the preparation of the binder possessing basic nitrogen groups.

4. A coating agent as set forth in claim 1, wherein the binder possessing basic nitrogen groups contains sulfonate groups in an amount of from 0.05 to 3%.

5. A coating agent as set forth in claim 1, wherein the crosslinking agent used is a highly etherified aminoplast resin having a low methylol content, and the phenoplast resin employed is a methylolated phenol which is etherified at the phenolic OH group with allyl alcohol, or a methylolated mono-, di- or polyphenol, some or all of whose methylol groups are etherified.

6. A method for the cathodic electrocoating of metal articles, wherein the binder used is a heat-curable coating agent as defined in claim 1, after protonation with an acid.

7. A method for the cathodic electrocoating of metal articles, wherein the binder used is the heat-curable coating agent as claimed in claim 1, after protonation with an acid.

8. The method of claim 6, wherein the heat-curable coating agent is as defined in claim 2.

9. The method of claim 6, wherein the heat-curable coating agent is as defined in claim 3.

10. The method of claim 6, wherein the heat-curable coating agent is as defined in claim 4.

11. The method of claim 6, wherein the heat-curable coating agent is as defined in claim 5.

* * * * *